United States Patent
Alwitt et al.

[11] B 3,919,604
[45] Nov. 11, 1975

[54] ELECTROLYTIC CAPACITOR HAVING AN INTEGRATED SPACER SYSTEM

[75] Inventors: Robert S. Alwitt; Sidney D. Ross, both of Williamstown, Mass.

[73] Assignee: Sprague Electric Company, North Adams, Mass.

[22] Filed: Aug. 14, 1972

[21] Appl. No.: 280,395

[44] Published under the Trial Voluntary Protest Program on January 28, 1975 as document no. B 280,395.

[52] U.S. Cl. ............................ 317/230; 29/570
[51] Int. Cl.² ..................... H01G 9/02; H01G 9/24
[58] Field of Search .................................. 317/230

[56] References Cited
UNITED STATES PATENTS

| | | | |
|---|---|---|---|
| 2,018,522 | 10/1935 | Herrmann et al. | 317/230 X |
| 2,031,128 | 2/1936 | Raines | 317/230 |

FOREIGN PATENTS OR APPLICATIONS

| | | | |
|---|---|---|---|
| 447,639 | 5/1936 | United Kingdom | 317/230 |

*Primary Examiner*—John Zazworsky
*Assistant Examiner*—William D. Larkins
*Attorney, Agent, or Firm*—Connolly and Hutz

[57] ABSTRACT

A convolutely wound capacitance section includes a formed anode of aluminum foil and a cathode contact foil electrode that advantageously carries an inert non-continuous and non-conducting spacer system on the major surfaces thereof. The spacer system is made by spraying highly electrostatically charged particles of a thermoplastic material onto a moving web of cathode foil. An amount of particles sufficient to cover less than 20 percent of the cathode foil surface is applied, thereby producing an advantageous spacer thereon that has its greatest particle density along the edges of the foil. This beneficial particle arrangement insures against shorting while maintaining a very thin spacer system and a lower ESR for capacitor units using this spacer system. The particles that have been sprayed onto the cathode foil adhere thereon through the electrostatic charge, and appropriate heat treatment causes further attachment of the particles to the foil.

4 Claims, 3 Drawing Figures

U.S. Patent Nov. 11, 1975 3,919,604 ically charged particles sprayed thereon so that a higher density of particles lie along these edges. The density of particle coverage is such that less than 20 percent of the cathode foil major surface is covered by the particles.

ELECTROLYTIC CAPACITOR HAVING AN INTEGRATED SPACER SYSTEM

BACKGROUND OF THE INVENTION

This invention relates to electrolytic capacitors having integrated spacer systems, and more particularly to an electrolytic capacitor having an inert non-conducting particle layer sintered onto a major surface of the cathode foil to separate the convolutely wound anode and cathode foils.

Electrolytic capacitors using convolutely wound metal-foil electrodes separated by interposed layers of dielectric spacer material have long been known to the art. Various types of spacer materials have been used over the years with varying degrees of success, and it is now well-known that the spacer is a major contributor to the equivalent series resistance (ESR) of an electrolytic capacitor. In order to minimize the ESR, thin spacers of high porosity are desirable. With conventional cellulosic spacers (Manila and Benares paper) now in use, the porosities and thicknesses that can be used are limited by the mechanical strength needed in the manufacture of the paper and the mechanical strength required for winding the capacitor. For example, the most porous spacer paper now in use is approximately 0.0024 inch thick Manila paper with a porosity of 79 percent. A thinner paper, 0.001 inch thick Benares paper, has a reduced porosity of 65 percent.

Of late, resin films have been used as dielectric spacers, either alone or in combination with paper layers. However, units produced with thin resin films alone are subject to "blocking." This condition results from the tendency of thin resin films to stick together. This blocking condition and the rather non-porous nature of the resin film tend to increase the ESR of the capacitor and severely inhibit the impregnation of an electrolyte into the convolutely wound capacitance section. Units produced with paper layers in combination with resin films are much too thick and are rather expensive to produce because extremely thin films must be used.

It has been proposed in the past to apply insulating coatings directly on the foil electrode to act as dielectric spacers. This has been carried out, for example, by applying insulating and/or mineral substances in a resinous binder to the foil by painting or dipping, or the like. In order to insure that there is good separation or spacing of the foil electrodes, a sufficient amount of insulating material must be deposited along the edges of the foil. Foil electrodes have burrs or the like on their edges that could lead to shorting problems when pressed together, unless the foil edges are properly coated with an insulating material or the like. However, since the above processes or procedures, by nature, produce a uniform coating on the foil surface, a rather uniformly thick amount of insulating material will also be present on the entire foil surface causing a decrease in the porosity of the spacer, and an increase in the ESR of the capacitor utilizing it. If too little coating is deposited on the foil, shorting problems are encountered at the edges of the foil.

It has also been suggested in the past, to deposit insulating ceramic or enamel frit and plastic particles on the foil by electrophoresis and spraying of molten plastic particles, respectively. These methods also produce a rather uniform distribution of spacer material that leads to either a thicker spacer element or poor edge coverage that could lead to a short-circuit problem. Also, in the unit using enamel frit particles, a rather rough surface is produced thereon that could have a harmful effect on the delicate oxide film that is formed on the anode electrode.

Accordingly, it is an object of this invention to provide an electrolytic capacitor that has a low equivalent series resistance.

Another object of the present invention is to provide a spacer system for an electrolytic capacitor that has an extremely high porosity, but has sufficient electrode separation so that the capacitor will not have short-circuit problems because of electrode foils contacting each other.

It is a further object of the invention to provide a spacer system for electrolytic capacitors that is an integrated part of the cathode foil.

SUMMARY OF THE INVENTION

An electrolytic capacitor has its convolutely wound electrode foils separated from each other by means of thermoplastic particles sintered onto the major surfaces of the cathode foil. Less than 20 percent of the surface of the cathode foil is covered by electrostatically charged thermoplastic particles that are sprayed thereon and later sintered thereto. The electrostatic method of spraying these particles onto a moving web of cathode foil advantageously insures a higher particle density along the critical edge portion of the foil than elsewhere thereon, thereby preventing the occurence of a short-circuit in this area. Since only a small total area of the entire electrode surface is covered by the particles, the spacer system produced thereby has an extremely high porosity and therefore produces an electrolytic capacitor having an advantageously low equivalent series resistance. The particles adhere to the cathode foil, on application, by means of the electrostatic charge they carry, and appropriate heat treatment then causes further attachment of the particles to the foil. The wound capacitance section can then be impregnated with a suitable electrolyte which fills the void spaces between the particles.

DESCRIPTION OF THE PREFERRED EMBODIMENT

Figure 1:
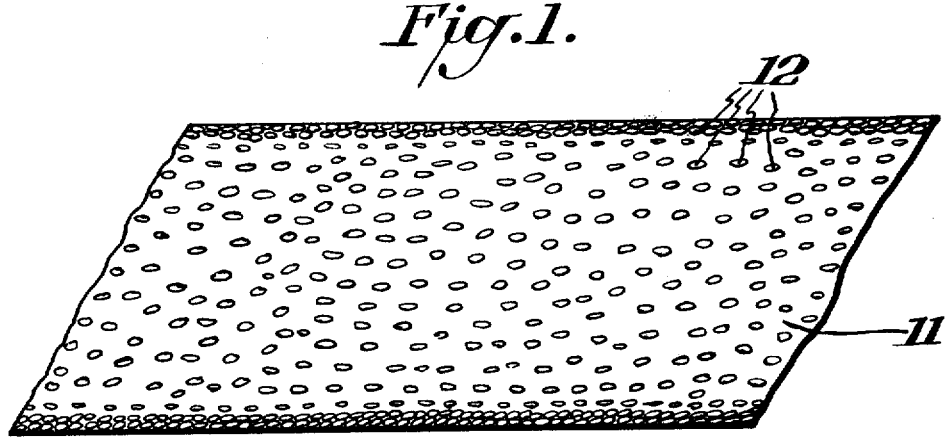
FIG. 1 is a plan view of a portion of a cathode foil electrode having the spacer system of this invention thereon.

A cathode foil is prepared to have a spacer system as an integral part thereof, as shown in FIG. 1. In that Figure, a cathode foil 11 has electrostatically charged particles 12 adhering to its surface. Only one major surface is shown herein as being coated; however, both major surfaces of the cathode 11 are preferably coated with the particles 12. The particles 12 are fibers, rods or spheres of an inert, non-conducting thermoplastic material. The particles 12 are electrostatically sprayed at a moving web of etched cathode foil. The charged particles 12 will adhere to the foil 11 forming a substantially non-continuous layer thereon, and the high field at the foil edges during spraying insures good coverage in this critical region. The edges of the foil 11 have a higher field than the center of the foil and consequently have a greater attraction for the charged particles, causing a higher or greater density of particles to occur at those edges than elsewhere on the foil 11. This advantageous deposition technique helps to prevent shorting at the edges of the electrode foils.

Prior art techniques of depositing a spacer system directly onto the electrodes of a capacitor do not offer this advantage. For example, an electrophoretic deposition of insulating material is carried out in water or the like, and since water has a high dielectric constant, approximately 80 at 20°C, the deposition will be a rather uniform coating, with no special attraction to the edges of the foil. The deposition medium in this invention is air or the like, which has a low dielectric constant of approximately 1, permitting the charged particles to advantageously seek out the foil edges.

After depositing the particles 12 on the surfaces of the cathode foil 11, the foil is heated for a short time and at a temperature that causes a sintering and further attaching of the particles 12 to the foil 11. The particles are quite small and should be able to pass through a 100-200 mesh sieve. The particle size shown in the drawing is somewhat exaggerated for demonstration purposes. Only an amount of the inert, non-conducting particles should be deposited on the foil that is sufficient to provide good foil edge coverage so as to prevent a short-circuit in the region. In the preferred embodiment about 10 percent of the total cathode foil surface is covered in order to give good edge coverage. However, a coverage of the foil surface area in the range of 1-20 percent can be sufficient for the purposes of this invention. If less than 1 percent coverage is attained, the resulting capacitor will have serious shorting problems; while if more than about 20 percent coverage is used on the foil, the resulting capacitor suffers from low porosity, and consequently, a high series resistance and lower capacitance. The approximate thickness of this spacer system should range from 0.0005 to 0.005 inch, if proper coverage is attained.

The particles have been described herein as inert, non-conducting rods, fibers or spheres of a thermoplastic material. Advantageously, the particles can be of nylon, epoxy resins, polyacrylonitriles or polycarbonates. The only requirements for particle material being that the particles are inert and nonconducting and are capable of being electrostatically charged and later sintered to the foil upon heating.

Figure 2:
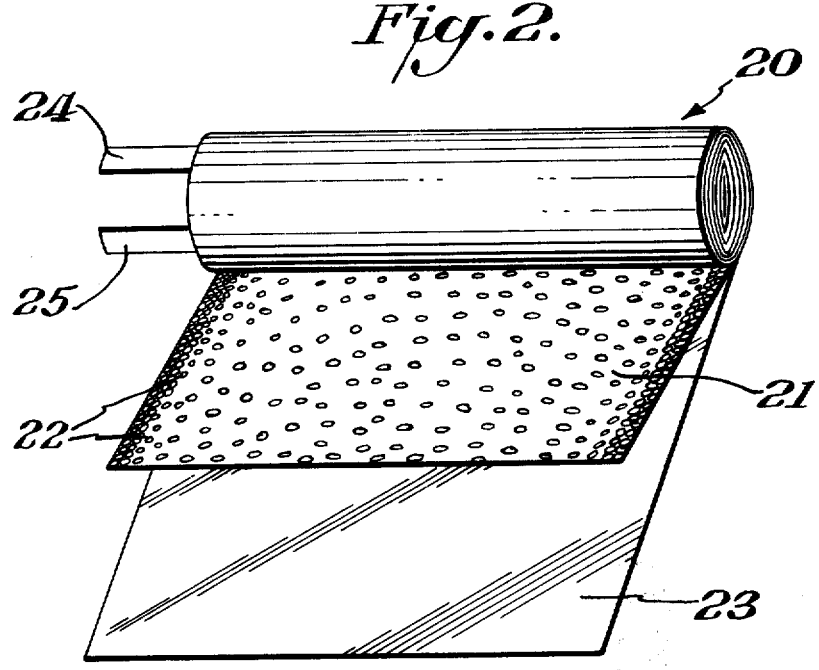
FIG. 2 shows a convolutely wound capacitance section utilizing the coated cathode of this invention.

The etched cathode foil carrying the spacer system of this invention can then be convolutely wound into a capacitance section, as shown in FIG. 2. A capacitance section 20 is composed of a convolutely wound formed anode foil 23 of a valve metal such as aluminum in contact with a cathode contact foil 21 having the inert, non-conducting spacer particles 22, on both major surfaces thereof. The capacitance section 20 has terminal leads 24 and 25 attached to electrodes 21 and 23, respectively. The wound capacitance section 20 can be placed in a suitable container and impregnated with an electrolyte.

Figure 3:
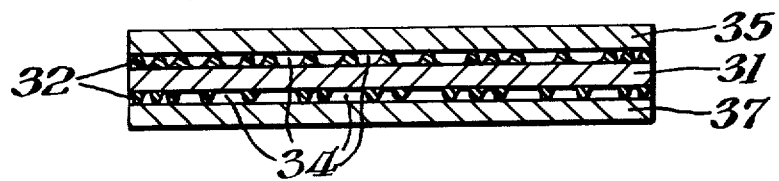
FIG. 3 is an enlarged cross-section of a portion of a wound capacitance section of this invention.

FIG. 3 shows an enlarged cross-section of a portion of a wound capacitance section wherein a cathode foil electrode 31 has spacer particles 32 attached to both major surfaces, and is sandwiched by formed anode foils 35 and 37. It can be noted therein that the particles 32 are advantageously preventing contact between the cathode 31 and the anodes 35 and 37. The voids 34 between the particles 32 are filled with electrolyte, providing for a good impregnation of the capacitance section. In order to keep the electrolyte in the interstices of this layer, or within the voids 34, it may sometimes be desirable to gel the electrolyte, in situ, after impregnation, by techniques known to those skilled in the art. However, any suitable electrolyte, such as a glycolborate electrolyte or a dimethylformamide based electrolyte, can be used for the purposes of this invention and be held between the cathode and anode foils by capillary action.

The preferred embodiment herein has an etched aluminum anode foil having a dielectric oxide ($Al_2O_3$) formed thereon by a conventional anodization technique known to those skilled in the art. An etched aluminum cathode foil has particles of an epoxy resin covering approximately 10 percent of the total surface area of both major surfaces, with a greater particle density occurring along the edges of the foil than elsewhere thereon. The particles are deposited by electrostatically spraying them onto a moving web of the cathode foil using parameters well known to those skilled in the art, for example, using an electrostatic force of 50,000-100,000 volts. Preferably these particles should be small enough to pass through a 150 mesh sieve. After spraying, the cathode foils are heated to approximately 75°-85°C to sinter the particles to the foils. The anode and cathode foils are then convolutely wound together to form a capacitance section.

While the above description has concentrated on coating both major surfaces of the cathode electrode, similar, although somewhat less desirable, results can be obtained by coating one major surface of the cathode and one major surface of the anode electrode. However, it is preferable to coat both cathode surfaces, since some difficulties may be encountered when attempting to coat an anode having a rather delicate anodic oxide film formed thereon.

While aluminum has been mentioned as the preferred anode metal, other valve metals, such as tantalum, niobium, vanadium and hafnium can also be used herein. The preferred cathode metal is aluminum, however, tantalum, niobium, vanadium and hafnium are also satisfactory. In the preferred embodiment the cathode foil is etched to increase the surface area of the foil prior to the deposition of the particles thereon, however, the cathode could also be etched subsequent to the deposition of the particles to the cathode, or not etched at all.

The method outlined herein for making the integrated spacer system provides an electrolytic capacitor that has a low ESR and no significant reduction in capacitance; and the spacer system of this invention can be applied directly on the cathode in one economical step, while insuring good spacer coverage of the critical edge region of the cathode.

Since it is obvious that many changes and modifications can be made in the above-described details without departing from the nature and spirit of the invention, it is to be understood that the invention is not limited to said details except as set forth in the appended claims.

What is claimed is:

1. An electrolytic capacitor comprising a capacitance section of convolutely wound electrodes, said electrodes being a formed anode foil electrode of a valve metal, and a cathode contact foil electrode having a substantially non-continuous spacer consisting essentially of inert non-conducting thermoplastic particles sintered onto at least one major surface thereof separating said anode and said cathode foil electrodes, said spacer particles covering from 1-20% of the total cathode surface area and having a greater particle density along the edges of said cathode foil electrode than elsewhere thereon, and an electrolyte in contact with said electrodes through said spacer.

2. The capacitor of claim 1 wherein said cathode foil is etched, said anode and said cathode foils are aluminum; said particles are selected from the group consisting of nylon, epoxy resins, polyacrylonitriles and polycarbonates; and said spacer has a thickness in the range of 0.0005 to 0.005 inch, and is sintered onto both major surfaces of the cathode foil.

3. The capacitor of claim 2 wherein said spacer particles covers approximately 10 percent of the total cathode surface area; and said thermoplastic material is an epoxy compound.

4. An electrolytic capacitor comprising: a capacitance section of convolutely wound electrodes, said electrodes being an aluminum foil anode electrode having an oxide film formed thereon, and a cathode contact foil electrode having a substantially non-continuous spacer consisting essentially of inert, non-conducting epoxy particles sintered onto both major surfaces thereof and separating said anode and said cathode, said spacer particles having a thickness in the range of 0.0005 to 0.005 inch and covering about 10% of the total cathode surface area with a greater particle density along the edges of said cathode foil electrode than elsewhere thereon; and an electrolyte in contact with said electrodes through said spacer.

* * * * *